(12) United States Patent
Takemura et al.

(10) Patent No.: US 12,720,007 B2
(45) Date of Patent: Aug. 25, 2026

(54) IMAGE DISPLAYING METHOD FOR SETTING A PROJECTION IMAGE SURFACE

(71) Applicant: SEIKO EPSON CORPORATION, Tokyo (JP)

(72) Inventors: Koji Takemura, Sapporo (JP); Teruyuki Miyazawa, Ueda (JP)

(73) Assignee: SEIKO EPSON CORPORATION, Tokyo (JP)

( * ) Notice: Subject to any disclaimer, the term of this patent is extended or adjusted under 35 U.S.C. 154(b) by 355 days.

(21) Appl. No.: 18/320,242

(22) Filed: May 19, 2023

(65) Prior Publication Data

US 2023/0379429 A1 Nov. 23, 2023

(30) Foreign Application Priority Data

May 19, 2022 (JP) ................................ 2022-082102

(51) Int. Cl.
*H04N 5/74* (2006.01)
*H04N 9/31* (2006.01)
*H04N 23/63* (2023.01)
*H04N 23/80* (2023.01)

(52) U.S. Cl.
CPC ............. *H04N 5/74* (2013.01); *H04N 9/3176* (2013.01); *H04N 23/633* (2023.01); *H04N 23/80* (2023.01)

(58) Field of Classification Search
CPC ...... G06T 19/006; H04N 13/344; H04N 5/74; H04N 23/633; H04N 23/80; H04N 9/3176
See application file for complete search history.

(56) References Cited

U.S. PATENT DOCUMENTS

2013/0293583 A1 11/2013 Kashitani
2015/0201181 A1 7/2015 Moore et al.
2015/0227222 A1 8/2015 Sako et al.
2016/0092608 A1 3/2016 Yamamoto et al.
2017/0371439 A1 12/2017 Sako et al.
2019/0116356 A1 4/2019 Matoba et al.
2020/0082632 A1 3/2020 Burns et al.
2020/0111232 A1* 4/2020 Bleyer .................... G06T 7/564
2020/0273235 A1* 8/2020 Emami ..................... G06T 7/50
2020/0394819 A1 12/2020 Reddan et al.
2021/0165558 A1 6/2021 Itagaki et al.
2022/0148269 A1 5/2022 Ukishiro et al.

FOREIGN PATENT DOCUMENTS

JP 2005-313291 A 11/2005
JP 2011-203824 A 10/2011
JP 2014-056044 A 3/2014
(Continued)

OTHER PUBLICATIONS

Bang & Olufsen (App instructions, 5 pgs.).
Epson Projector Throw Distance Simulator (1 page).
Sony Optimal Viewing Area Simulation (3 pgs.).

*Primary Examiner* — Weiming He
(74) *Attorney, Agent, or Firm* — Dority & Manning, P.A.

(57) ABSTRACT

An image displaying method including accepting from a user setting operation of setting a first surface of an object located in a real space as a plane onto which a projection image is virtually displayed, and displaying a first superimposed image in which a setting image showing a plane containing the first surface is superimposed on a captured image generated by capturing an image of the object.

15 Claims, 9 Drawing Sheets

(56) References Cited

FOREIGN PATENT DOCUMENTS

| | | | |
|---|---|---|---|
| JP | 2015-212892 | A | 11/2015 |
| JP | 2017-059931 | A | 3/2017 |
| JP | 2017-510133 | A | 4/2017 |
| JP | 2019-207498 | A | 12/2019 |
| JP | 2020-042802 | A | 3/2020 |
| JP | 2020-098568 | A | 6/2020 |
| JP | 2020-201922 | A | 12/2020 |
| JP | 2021-068272 | A | 4/2021 |
| JP | 2021-103527 | A | 7/2021 |
| WO | WO 2014/045683 | A | 3/2014 |
| WO | WO2014/192316 | A | 12/2014 |
| WO | WO2016/088493 | A | 6/2016 |
| WO | WO2017/179272 | A | 10/2017 |
| WO | WO2019/017023 | A | 1/2019 |
| WO | WO2020/054203 | A | 3/2020 |

* cited by examiner

IMAGE DISPLAYING METHOD FOR SETTING A PROJECTION IMAGE SURFACE

The present application is based on, and claims priority from JP Application Serial Number 2022-082102, filed May 19, 2022, the disclosure of which is hereby incorporated by reference herein in its entirety.

BACKGROUND

1. Technical Field

The present disclosure relates to an image display method, an information processing apparatus, and a non-transitory computer-readable storage medium storing program.

2. Related Art

What is called an augmented reality (AR) technology has been developed to assist a user to acquire visual information by superimposing, for example, computer graphics (CG) on a captured image as a result of capturing an image of a real space and then displaying the superimposed image. For example, JP-A-2011-203824 discloses an image processing apparatus that identifies the position of an object in a real space based on an input image generated by capturing an image of the object with an imaging device and characteristics data representing the characteristics of the appearance of the object. The image processing apparatus determines the position of an image superimposed on the input image based on the identified position of the object.

When the image processing apparatus described in JP-A-2011-203824 stores no characteristics data on the object to be captured in the form of an image, the position of the object cannot be identified, resulting in a problem of inappropriate positioning of the image to be superimposed.

SUMMARY

An image displaying method according to an aspect of the present disclosure includes accepting from a user setting operation of setting a first surface of an object located in a real space as a plane onto which a projection image is virtually displayed, and displaying a first superimposed image in which a setting image showing a plane containing the first surface is superimposed on a captured image generated by capturing an image of the object.

An information processing apparatus according to another aspect of the present disclosure includes a processing device, and the processing device accepts from a user setting operation of setting a first surface of an object located in a real space as a plane onto which a projection image is virtually displayed, and outputs to a display device a first superimposed image in which a setting image showing a plane containing the first surface is superimposed on a captured image generated by capturing an image of the object.

A program according to another aspect of the present disclosure causes a processing device to accept from a user setting operation of setting a first surface of an object located in a real space as a plane onto which a projection image is virtually displayed, and output to a display device a first superimposed image in which a setting image showing a plane containing the first surface is superimposed on a captured image generated by capturing an image of the object.

DESCRIPTION OF EXEMPLARY EMBODIMENTS

Figure 1:
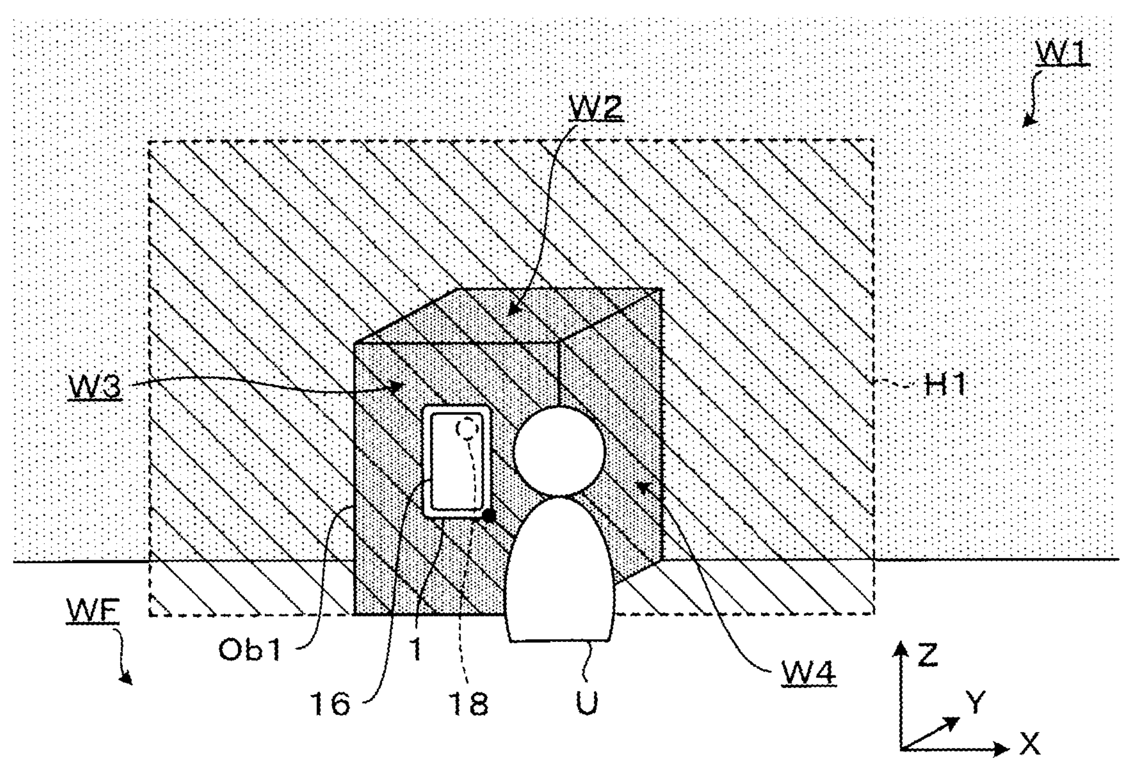
FIG. 1 is a diagrammatic view illustrating a space in which an object is located.

A preferable embodiment according to the present disclosure will be described below with reference to the accompanying drawings. In the drawings, the dimensions and scale of each portion differ from actual values in some cases, and some of the portions are diagrammatically drawn for ease of understanding. The scope of the present disclosure is not limited to the embodiment unless particular restrictions on the present disclosure are made in the following description. In the present specification and the claims, when a numerical range is expressed by using "$\Phi$ to $\Psi$" ($\Phi$ and $\Psi$ are both numerical values), the range includes the numerical values of the upper limit ($\Psi$) and the lower limit ($\Phi$). The upper limit ($\Psi$) and the lower limit ($\Phi$) are expressed in the same unit.

1. Embodiment

In the embodiment, an image displaying method, an information processing apparatus, and a program according to the present disclosure will be described by illustrating a smartphone that acquires a captured image by capturing an image of an object having a side surface set as a plane onto which a predetermined image is virtually displayed, superimposes an image showing a plane containing the side surface on the captured image, and displays the superimposed image.

1.1. Overview of Smartphone

Figure 2:
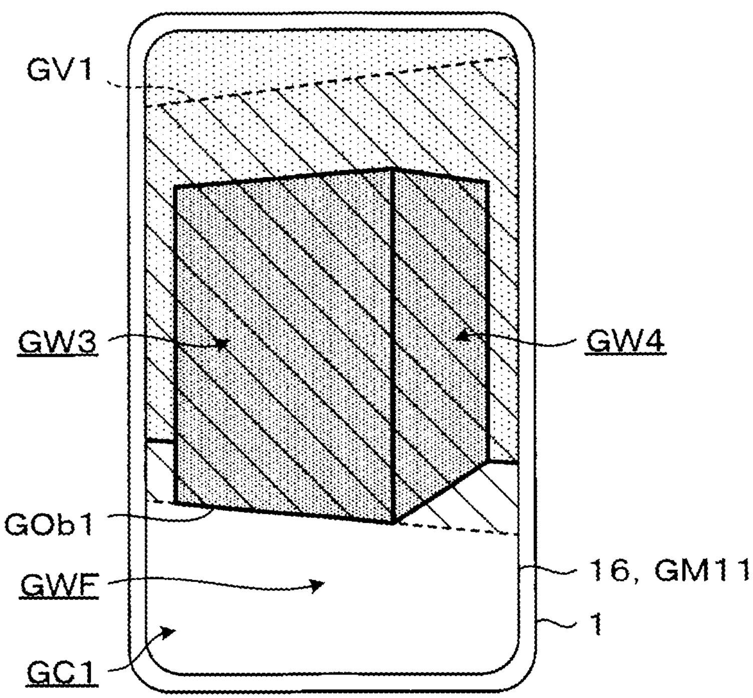
FIG. 2 is a diagrammatic view for describing a first superimposed image.
Figure 3:
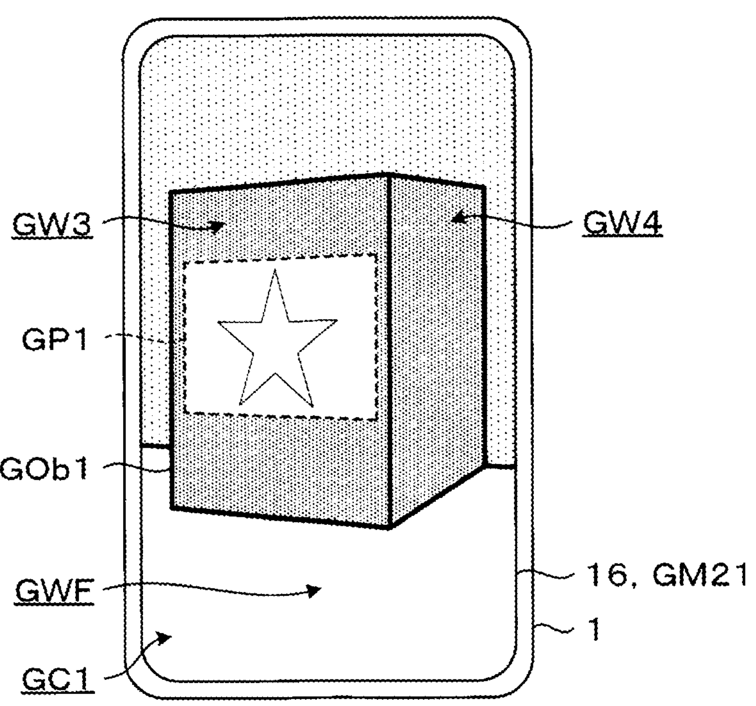
FIG. 3 is a diagrammatic view for describing a second superimposed image.
Figure 4:
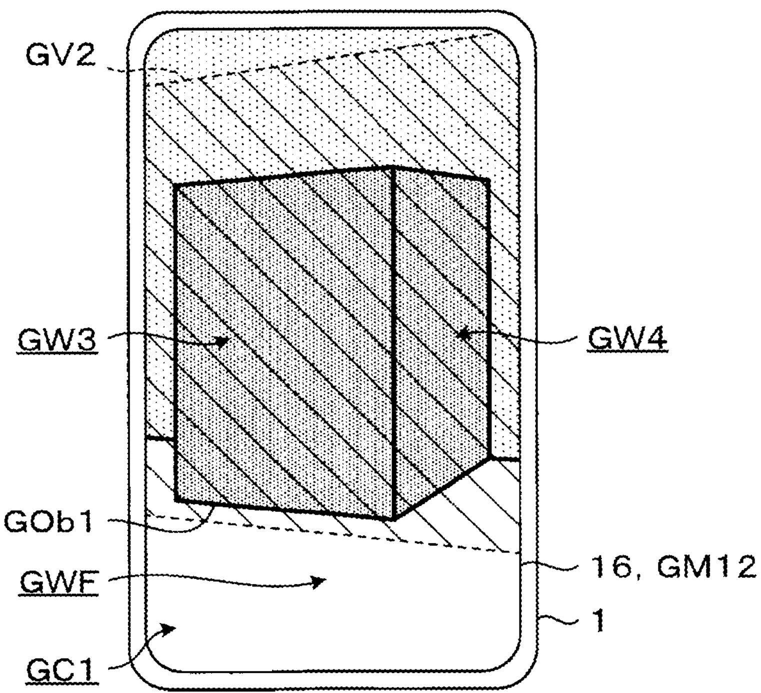
FIG. 4 is a diagrammatic view for describing another first superimposed image.

A smartphone 1 according to the present embodiment will be described below with reference to FIGS. 1 to 4. FIG. 1 is a diagrammatic view illustrating a real space in which an object Ob 1 is located. FIGS. 2 to 4 are diagrammatic views for describing images displayed on a touch panel 16 provided in the smartphone 1.

The object Ob1 is a box-shaped object having surfaces W2, W3, and W4. The surface W2 is one of the bottom surfaces of the object Ob1 that is the bottom surface being not in contact with a floor surface WF. The surface W3 is one of the side surfaces of the object Ob1 that is the side surface parallel to a wall surface W1. The surface W4 is one of the side surfaces of the object Ob1 that is the side surface perpendicular to the wall surface W1. The object Ob1 is in contact with the wall surface W1 via the side surface opposite from the surface W3. A plane H1 is a conceptual plane containing the surface W3. That is, the plane H1 does not really exist in the real space and is therefore not directly visible to a user U. Note that the object Ob1 does not necessarily have the shape of a box and may have any other shape as long as the shape has at least one flat surface.

In the present embodiment, the wall surface W1, the surface W3, and the plane H1 are parallel to Z- and X-axes. The Z-axis is an axis parallel to the vertical direction. Furthermore, the Z-axis is perpendicular to the floor surface WF. Out of the directions parallel to the Z-axis, the downward vertical direction is called a direction −Z, and the opposite direction of the direction −Z is called a direction +Z. The X-axis is perpendicular to the Z-axis and parallel to the wall surface W1, the surface W3, and the plane H1. Furthermore, the X-axis is perpendicular to the surface W4. Out of the directions parallel to the X-axis, the direction from the surface W4 toward the side surface opposite from the surface W4 is called a direction −X, and the opposite direction of the direction −X is called a direction +X. An axis perpendicular to the Z- and X-axes is referred to as a "Y-axis". The Y-axis is perpendicular to the wall surface W1, the surface W3, and the plane H1. Out of the directions parallel to the Y-axis, the direction from the surface W3 toward the wall surface W1 is called a direction +Y, and the opposite direction of the direction +Y is called a direction −Y.

With the smartphone 1 being in contact with the surface W3 of the object Ob1, the user U performs the operation of setting the surface W3 as a plane in which a projection image GP1, which will be described later, is virtually displayed. Specifically, the user U performs the operation with an imaging device 18 provided in the smartphone 1 being in contact with the surface W3. In the present embodiment, "virtually displayed" means that the smartphone 1 displays an image captured with the imaging device 18 of the smartphone 1 through capturing an image of the real space with another image superimposed on the real space image. In the present embodiment, the operation of setting the surface W3 as the plane in which the projection image GP1 is virtually displayed may be referred to as "setting operation". The smartphone 1 accepts the setting operation from the user U with the smartphone 1 located at the surface W3 of the object Ob1. The setting operation may, for example, be long pressing the touch panel 16 for a predetermined period or longer. The setting operation may instead be the operation performed on a virtual operator representing the setting operation, such as a finalizing button image displayed on the touch panel 16.

FIG. 2 is a diagrammatic view for describing a first superimposed image GM11. The first superimposed image GM11 is an image displayed on the touch panel 16 when the smartphone 1 accepts the setting operation from the user U with the smartphone 1 located at the surface W3 of the object Ob1. The first superimposed image GM11 is an image in which a setting image GV1 is superimposed on a captured image GC1 generated by the imaging device 18 through capturing an image of the object Ob1. The captured image GC1 contains images GOb1 and GWF. The image GOb1 contains images GW3 and GW4. The image GW3 is an image showing the surface W3. The image GW4 is an image showing the surface W4. The image GWF is an image showing the floor surface WF. The setting image GV1 is an image showing the plane H1 containing the surface W3. The setting image GV1 represents a virtual plane in which the projection image GP1 is virtually displayed.

Since the plane H1 is not directly visible to the user U, a portion of or the entire region of the setting image GV1 is preferably semitransparent. The user U can thus compare the user U's own field of view with the captured image GC1 contained in the first superimposed image GM11. The setting image GV1 is an image showing the position of the plane in which the projection image GP1 is virtually displayed. In FIG. 2, the image GW3, which is the image showing the surface W3, coincides with a portion of the setting image GV1. Specifically, one of the four edges of the image GW3 coincides with a portion of the bottom edge of the setting image GV1. The user U can thus see that the plane in which the projection image GP1 is virtually displayed is the surface W3 by checking the setting image GV1.

After accepting the setting operation from the user U, the smartphone 1 acquires the captured image GC1 by capturing an image of the object Ob1. The smartphone 1 further generates the first superimposed image GM11 by superimposing the setting image GV1 on the captured image GC1. The smartphone 1 then displays the first superimposed image GM11 on the touch panel 16.

FIG. 3 is a diagrammatic view for describing a second superimposed image GM21. The second superimposed image GM21 is an image in which the projection image GP1 is superimposed on the image GW3 contained in the captured image GC1.

When the smartphone 1 accepts the operation of displaying the projection image GP1 from the user U, the smartphone 1 generates the second superimposed image GM21 by superimposing the projection image GP1 on the captured image GC1. The smartphone 1 then displays the second superimposed image GM21 on the touch panel 16. That is, the smartphone 1 can display the projection image GP1 superimposed on the image GW3 showing the surface W3. In other words, the smartphone 1 can virtually display the projection image GP1 on the surface W3 by using the touch panel 16. The second superimposed image GM21 may or may not contain the setting image GV1. The second superimposed image GM21 in the present embodiment does not contain the setting image GV1. When the second superimposed image GM21 contains the setting image GV1, the user U readily understand the positional relationship between the surface set by the user U's setting operation and the projection image GP1. When the second superimposed image GM21 does not contain the setting image GV1, the smartphone 1 can present the user U the second superimposed image GM21 more closely showing the situation in which the image is actually projected onto the surface W3. In the present embodiment, the operation of displaying the projection image GP1 may be referred to as "display operation". The display operation may, for example, be the operation of tapping the setting image GV1 contained in the first superimposed image GM11 displayed on the touch panel 16. The display operation may instead be the operation of tapping a virtual operator displayed on the touch panel 16 and accepting an instruction of displaying the projection image GP1.

FIG. 4 is a diagrammatic view for describing a first superimposed image GM12. The first superimposed image GM12 is an image in which a setting image GV2 is superimposed on the captured image GC1. The setting image GV2 is an image showing a plane different from the plane H1, that is, a plane that does not contain the surface W3. For example, when the user U does not correctly perform the setting operation, specifically, when the setting operation is performed at a position where the imaging device 18 provided in the smartphone 1 is separate from the surface W3 in the direction −Y, the smartphone 1 displays the first superimposed image GM12 on the touch panel 16. That is, when the first superimposed image GM12 containing the setting image GV2 is displayed on the touch panel 16, the user U can ascertain that the setting operation has not been performed with the imaging device 18 located at the surface W3. On the other hand, when the first superimposed image GM11 containing the setting image GV1 is displayed on the touch panel 16 as shown in FIG. 2, the user U can ascertain that the setting operation has been performed with the imaging device 18 located at the surface W3.

When the setting operation has not been performed with the imaging device 18 located at the surface W3, the surface W3 has not been set as the plane in which the projection image GP1 is virtually displayed. That is, the smartphone 1 cannot in some cases display the projection image GP1 superimposed on the image GW3 showing the surface W3. When the first superimposed image GM12 is displayed on the touch panel 16, the user U can superimpose the projection image GP1 on the image GW3 by performing the setting operation again with the smartphone 1 being in contact with the surface W3 of the object Ob1. In the present embodiment, performing the setting operation again may be referred to as "resetting operation".

1.2. Procedure Up to Point where First Superimposed Image is Displayed

The procedure up to the point where the first superimposed image GM11 is displayed on the touch panel 16 will be described with reference to FIGS. 5 to 9.

Figure 5:
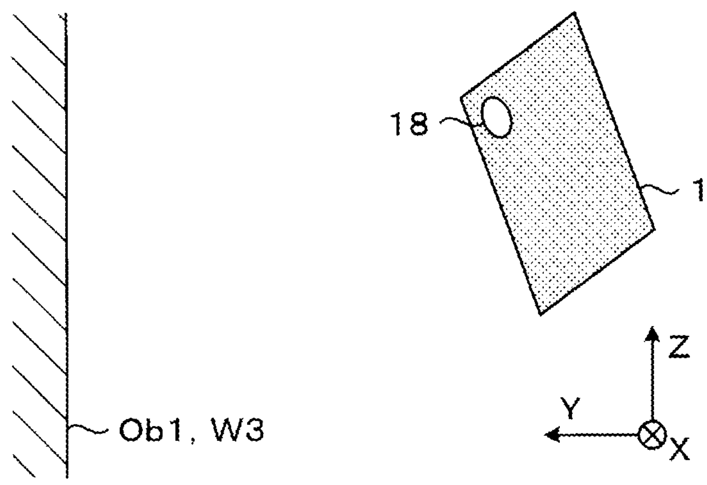
FIG. 5 is a diagrammatic view illustrating detection operation.

FIG. 5 is a diagrammatic view illustrating detection operation. The smartphone 1 has the function of detecting a flat surface of the object Ob1 by using image processing, for example, to extract characteristic points from a captured image generated by capturing an image of the flat surface of the object Ob1. When the surface of the object Ob1 is detected, the smartphone 1 sets the surface of the object Ob1 as the plane in which the projection image GP1 is virtually displayed. That is, when the surface W3 of the object Ob1 is detected, the smartphone 1 sets the surface W3 as the plane in which the projection image GP1 is virtually displayed.

The smartphone 1 accepts from the user U the operation of instructing detection of the surface W3 of the object Ob1 with the captured image generated by capturing an image of the object Ob1 displayed on the touch panel 16. When the operation of instructing detection of the surface W3 of the object Ob1 is accepted, the smartphone 1 attempts to detect the surface W3 based on the captured image. In the present embodiment, the operation of instructing detection of the surface W3 of the object Ob1 may be referred to as "detection operation". The detection operation may, for example, be the operation of tapping an image showing the object Ob1 contained in the captured image displayed on the touch panel 16. The detection operation may instead be the operation of tapping a virtual operator displayed on the touch panel 16 and accepting an instruction of performing the surface detection.

Figure 8:
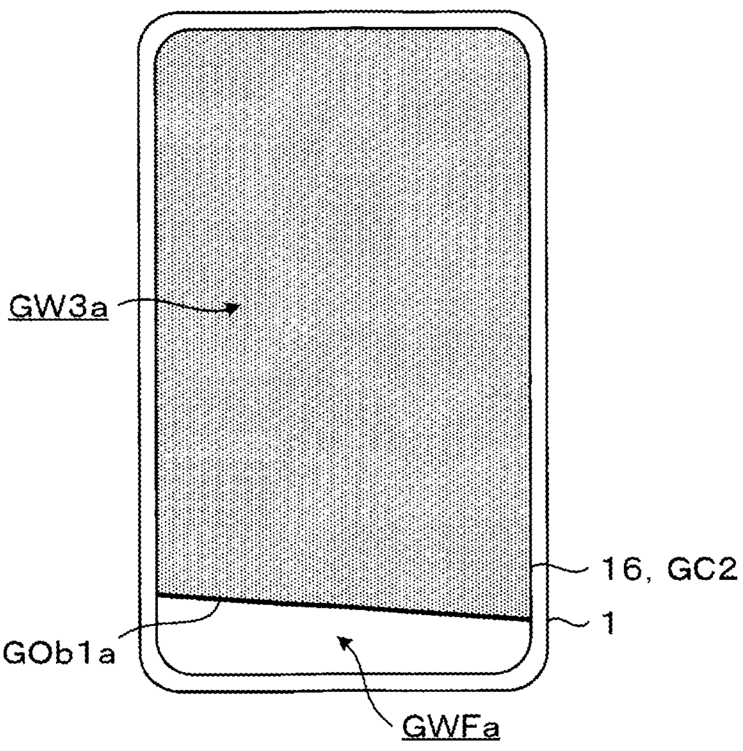
FIG. 8 is a diagrammatic view for describing a monitor image.

FIG. 8 is a diagrammatic view for describing a monitor image GC2. The monitor image GC2 is a captured image generated by the imaging device 18 through capturing an image of the object Ob1. The monitor image GC2 contains images GOb1*a* and GWFa. The image GOb1*a* contains an image GW3*a*. The image GW3*a* is an image showing the surface W3. The image GWFa is an image showing the floor surface WF.

When image processing is used to extract a characteristic point from an image, a point that allows accurate determination of the position thereof is typically extracted as the characteristic point. Specifically, a characteristic point is preferably a point where the amount of change in luminance or any other factor between adjacent pixels is large both in the vertical and horizontal directions of the image. A location where the amount of change in luminance or any other factor between adjacent pixels is large both in the vertical and horizontal directions of the image may, for example, be an angular portion contained in the image. Since the monitor image GC2 contains no angular portion as seen from FIG. 8, no characteristic point is unlikely to be accurately extracted through image processing. Therefore, when the user U performs the detection operation with the monitor image GC2 displayed on the touch panel 16, the smartphone 1 may not be able to detect the surface W3.

Figure 9:
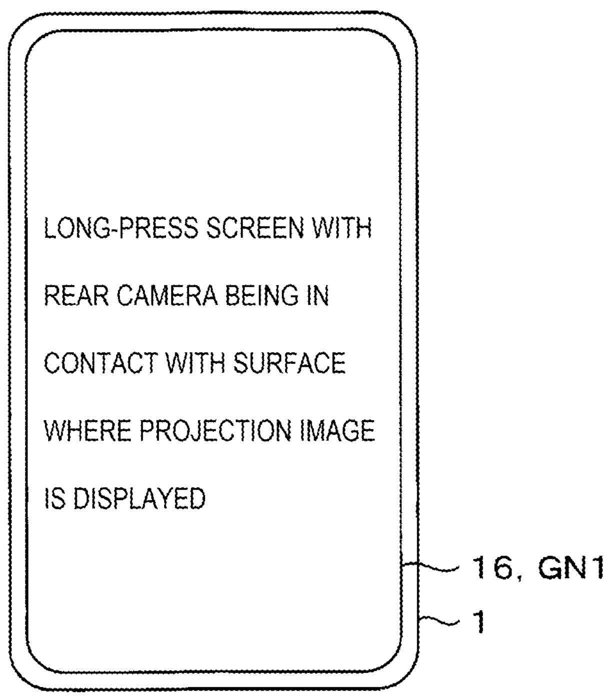
FIG. 9 is a diagrammatic view for describing a notification image.

When the surface W3 is not detected, the smartphone 1 prompts the user U to perform the setting operation. For example, the smartphone 1 may display a message on the touch panel 16 to prompt the user U to perform the setting operation. FIG. 9 is a diagrammatic view for describing a notification image GN1. The notification image GN1 is an image containing a message that prompts the user U to perform the setting operation. Displaying the notification image GN1 on the touch panel 16 is, in other words, outputting notification about the setting operation.

Figure 6:
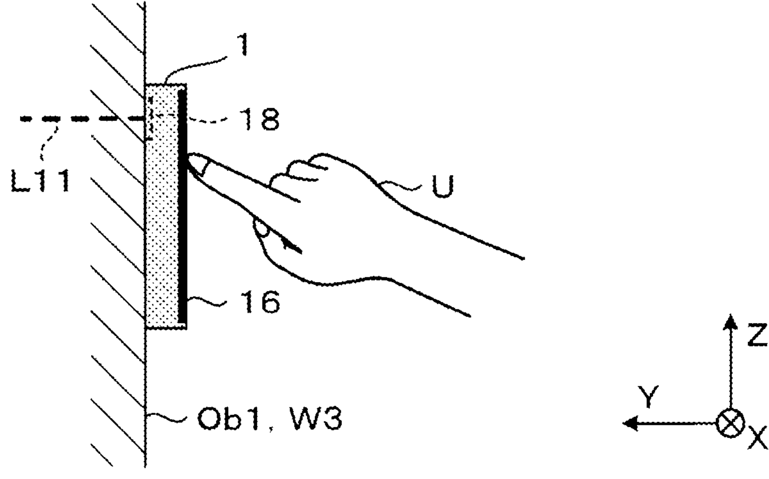
FIG. 6 is a diagrammatic view illustrating setting operation.

FIG. 6 is a diagrammatic view illustrating the setting operation. The user U sets the surface W3 as the plane in which the projection image GP1 is virtually displayed by long-pressing the touch panel 16 for a predetermined period or longer, that is, performing the setting operation with the imaging device 18 provided in the smartphone 1 being in contact with the surface W3. When the smartphone 1 accepts the setting operation from the user U, the smartphone 1 sets the surface W3 as the plane in which the projection image GP1 is virtually displayed. The smartphone 1 sets the position of the imaging device 18 at the point of time when the smartphone 1 accepts the setting operation as a reference position. The smartphone 1 further sets the optical axis of the imaging device 18 at the point of time when the smartphone 1 accepts the setting operation as a reference axis. The optical axis of the imaging device 18 at the point of time when the smartphone 1 accepts the setting operation is referred to as an "optical axis L11". The optical axis L11 is perpendicular to the surface W3 and parallel to the Y-axis. The point of time when the smartphone 1 accepts the setting operation is referred to as a "first point of time".

Figure 7:
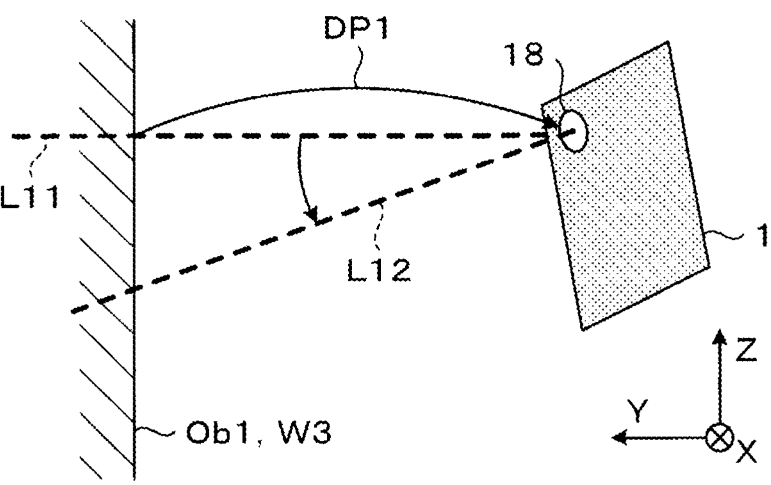
FIG. 7 is a diagrammatic view illustrating the displayed first superimposed image.

FIG. 7 is a diagrammatic view illustrating the displayed first superimposed image GM11. After accepting the setting operation, the smartphone 1 controls the imaging device 18 to acquire the captured image GC1 by capturing an image of the object Ob1 from a position separate from the surface W3 in the direction −Y. The point of time when the imaging device 18 acquires the captured image GC1 is referred to as a "second point of time". The displacement of the imaging device 18 that occurs between the first and second points of time is referred to as a "displacement DP1". The term "displacement" used herein refers to a vector representing the change in position of the imaging device 18. The optical axis of the imaging device 18 at the second point of time is referred to as an "optical axis L12". The smartphone 1 generates the setting image GV1 based on the displacement DP1 and a change in posture of the imaging device 18 that occurs between the first and second points of time. The smartphone 1 further generates the first superimposed image GM11 by superimposing the setting image GV1 on the captured image GC1. The smartphone 1 then displays the first superimposed image GM11 on the touch panel 16.

The change in the posture of the imaging device 18 is expressed, for example, by three-dimensional angles of rotation around the optical axis of the imaging device 18 as the rolling axis, an axis parallel to the widthwise direction of the smartphone 1 as the pitching axis, and an axis parallel to the lengthwise direction of the smartphone 1 as the yawing axis with the imaging device 18 being the origin. The change in the posture of the imaging device 18 is specifically expressed by the rolling, pitching, and yawing angles at the point of time when the smartphone 1 captures an image of the object Ob1, provided that the rolling, pitching, and yawing angles at the point of time when the smartphone 1 accepts the setting operation are all 0°. That is, the change in the posture of the imaging device 18 that occurs between the first and second points of time is expressed by changes in the rolling, pitching, and yawing angles that occur when the optical axis of the imaging device 18 changes from the optical axis L11 to the optical axis L12.

1.3. Configuration and Functions of Smartphone

The configuration and functions of the smartphone 1 according to the present embodiment will be described below with reference to FIGS. 10 and 11.

Figure 10:
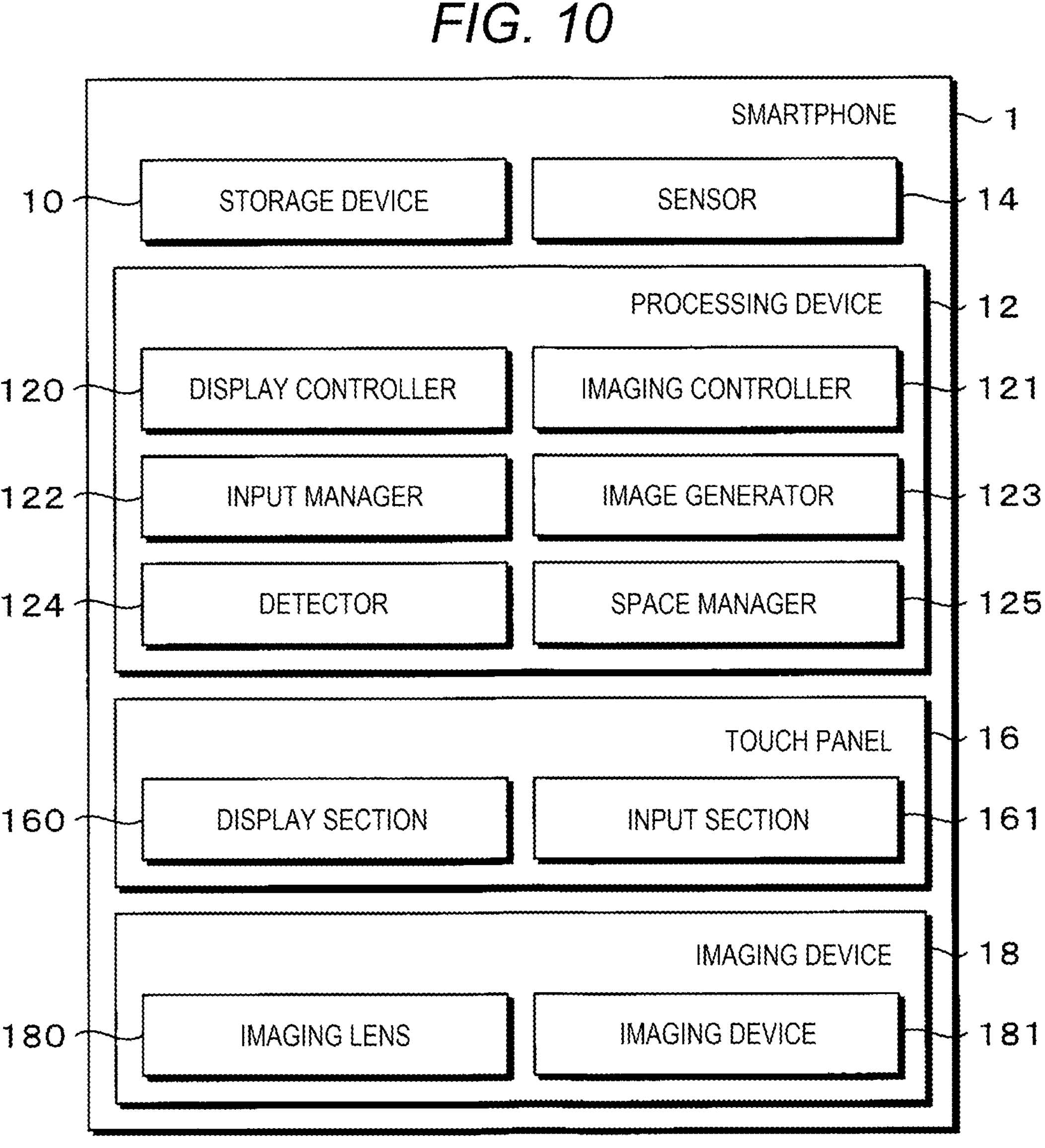
FIG. 10 is a block diagram showing the configuration of a smartphone according to an embodiment.

FIG. 10 is a block diagram showing the configuration of the smartphone 1 according to the embodiment. The smartphone 1 includes a storage device 10, which stores a variety of pieces of information, a processing device 12, which controls the action of the smartphone 1, a sensor 14, which outputs a signal based on a change in the position of the smartphone 1 and a signal based on a change in the posture of the smartphone 1, the touch panel 16, which displays a variety of images and accepts operation from the user U, and the imaging device 18, which captures an image of the object Ob1. The processing device 12 functions as a display controller 120, an imaging controller 121, an input manager 122, an image generator 123, a detector 124, and a space manger 125. The touch panel 16 includes a display section 160 and an input section 161. The imaging device 18 includes an imaging lens 180 and an imaging device 181.

The storage device 10 includes, for example, a volatile memory, such as a RAM, and a nonvolatile memory, such as a ROM. RAM is an abbreviation for a random access memory. ROM is an abbreviation for a read only memory.

Figure 11:
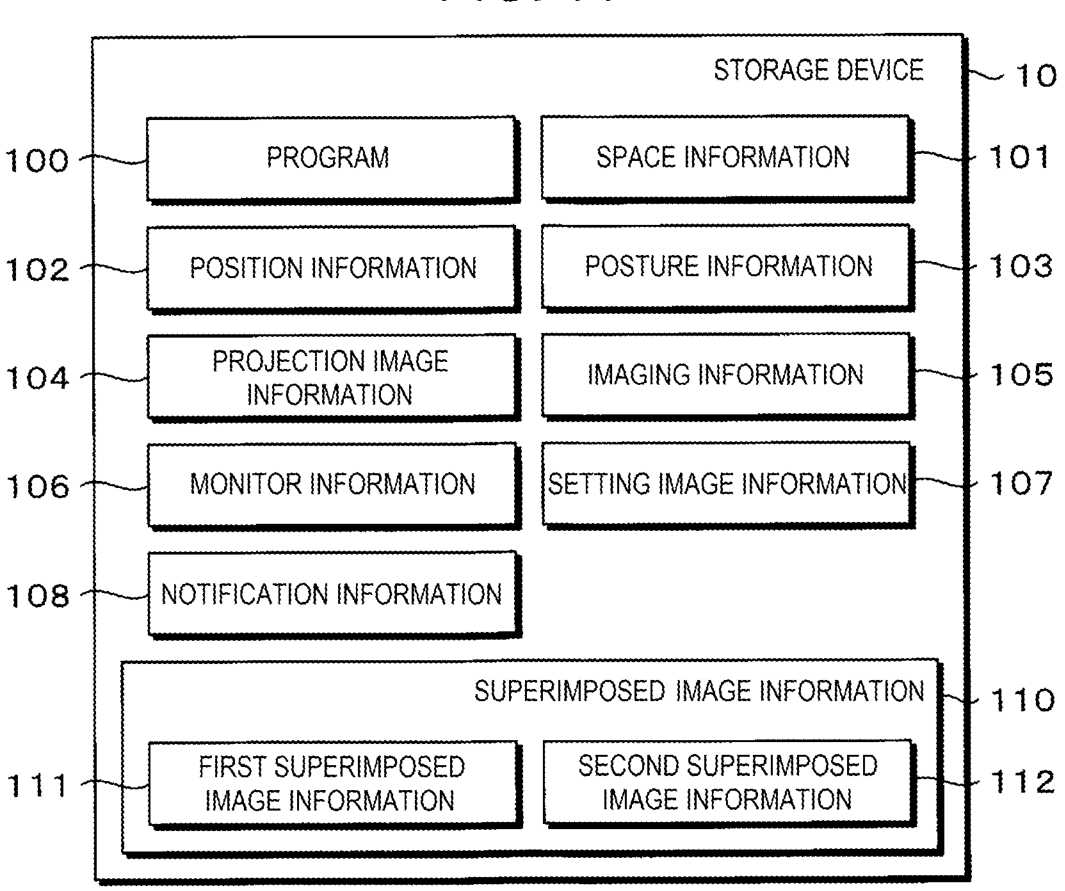
FIG. 11 is a block diagram showing the configuration of a storage device according to the embodiment.

FIG. 11 is a block diagram showing the configuration of the storage device 10 according to the embodiment. The nonvolatile memory provided in the storage device 10 stores a program 100, which defines the action of the smartphone 1, space information 101 containing information representing the position and shape of a detected object, position information 102 based on the change in the position of the imaging device 18, posture information 103 based on the change in the posture of the imaging device 18, projection image information 104 representing the projection image GP1, imaging information 105 representing the captured image GC1, monitor information 106 representing the monitor image GC2, setting image information 107 representing the setting image GV1, notification information 108 representing the notification image GN1, and superimposed image information 110. The superimposed image information 110 contains first superimposed image information 111 representing the first superimposed image GM11 and second superimposed image information 112 representing the second superimposed image GM21.

The volatile memory provided in the storage device 10 is also used by the processing device 12 as a work area when the processing device 12 executes the program 100.

A portion or the entirety of the storage device 10 may be provided in an external storage apparatus, an external server, or any other component. A portion or the entirety of the variety of pieces of information stored in the storage device 10 may be stored in the storage device 10 in advance, or may be acquired from the external storage apparatus, the external server, or any other component.

The processing device 12 includes one or more CPUs. It is, however, noted that the processing device 12 may include a programmable logic device, such as an FPGA, in place of or in addition to the CPU. The CPU is an abbreviation for a central processing unit, and FPGA is an abbreviation for a field-programmable gate array.

The processing device 12 functions as the display controller 120, the imaging controller 121, the input manager 122, the image generator 123, the detector 124, and the space manager 125 shown in FIG. 10 by causing the CPU or any other component provided in the processing device 12 executes the program 100 and operates in accordance with the program 100.

The display controller 120 controls the display section 160 provided in the touch panel 16 to display a variety of images. In other words, the display controller 120 outputs a variety of images to the display section 160 provided in the touch panel 16.

The imaging controller 121 controls the imaging device 18 to capture an image of the object Ob1. The imaging controller 121 then acquires information representing the result of the capturing an image of the object Ob1 from the imaging device 18. The imaging controller 121 causes the storage device 10 to store the information acquired from the imaging device 18. In the present embodiment, the imaging controller 121 acquires the imaging information 105 and the monitor information 106 as the information representing the result of the capturing an image of the object Ob1. The imaging controller 121 then causes the storage device 10 to store the acquired imaging information 105 and monitor information 106.

The imaging controller 121 further generates the position information 102 and the posture information 103 based on the signals outputted from the sensor 14. In the present embodiment, the position information 102 is information representing the displacement DP1. The posture information 103 is information representing the change in the posture of the imaging device 18 that occurs between the first and second points of time. The imaging controller 121 causes the storage device 10 to store the generated position information 102 and posture information 103.

The input manager 122 controls the input section 161 provided in the touch panel 16 to acquire information representing the content of operation received from the user U. The input manager 122 further performs a variety of types of determination relating to the operation accepted from the user U.

The detector 124 detects a flat surface of the object Ob1 by using image processing to extract characteristic points from the captured image generated by capturing an image of the object Ob1. In other words, the detector 124 determines whether the captured image contains an image showing a flat surface of the object Ob1. In the present embodiment, the detector 124 determines whether the monitor image GC2 contains an image showing the surface W3 of the object Ob1. The captured image that is subject to the determination of whether the captured image contains an image showing a flat surface of the object Ob1 may be referred to as a "monitor image".

Any known image processing technology may be used in the function of extracting the characteristic points from the captured image. The known image processing technology relating to extraction of the characteristic points is, for example, an algorithm called "AKAZE". No detailed technical description relating to the extraction of the characteristic points will be made in the present specification.

The space manager 125 manages the space information 101, which contains information representing the position and shape of an object disposed in the real space. For example, the space manager 125 updates the space information 101 based on the position and shape of the detected surface of the object Ob1.

The space information 101 contains information on the position where the smartphone 1 has accepted the setting operation. Based on the signals outputted from the sensor 14, the space manager 125 updates the space information 101 in such a way that the position of the smartphone 1 at the first point of time, when the setting operation is accepted from the user U, is the reference position. More specifically, the space manager 125 updates the space information 101 in such a way that the position of the imaging device 18 at the first point of time is, for example, the origin. By updating the space information 101, the space manager 125 sets the plane in which the projection image GP1 is virtually displayed in such a way that the plane contains the position of the imaging device 18 at the first point of time. That is, when the setting operation is accepted from the user U with the imaging device 18 located at the surface W3 of the object Ob1, the space manager 125 sets the surface W3 as the plane in which the projection image GP1 is virtually displayed. The plane in which the projection image GP1 is virtually displayed is, for example, set so as to be perpendicular to the optical axis L11 of the imaging device 18 at the first point of time.

The image generator 123 generates the setting image information 107 based on the space information 101, the position information 102, and the posture information 103. In other words, the image generator 123 generates the setting image GV1 based on the space information 101, the position information 102, and the posture information 103. The image generator 123 further generates the first superimposed image information 111 based on the set image information 107 and the imaging information 105. In other words, the image generator 123 generates the first superimposed image GM11 based on the setting image GV1 and the captured image GC1. The image generator 123 further generates the second superimposed image information 112 based on the projection image information 104 and the imaging information 105. In other words, the image generator 123 generates the second superimposed image GM21 based on the projection image GP1 and the captured image GC1.

The sensor 14 includes an acceleration sensor and a gyro sensor. The sensor 14 detects a change in the position of the smartphone 1 and a change in the posture of the smartphone 1. The sensor 14 outputs a signal based on the change in the position of the smartphone 1 and a signal based on the change in the posture of the smartphone 1 to the processing device 12.

The touch panel 16 is an apparatus including the display section 160, which displays an image, and the input section 161, which accepts operation inputted from the user U, with the two components integrated into a single unit. The display section 160 is what is called a display panel, and includes, for example, a liquid crystal panel or an organic EL panel. EL is an abbreviation for electro-luminescence. The display section 160 displays a variety of images under the control of the display controller 120. The input section 161 includes, for example, a transparent-sheet-shaped contact sensor. The input section 161 is provided so as to cover the display section 160. The input section 161 uses electrostatic capacity identified by the input section 161 and an object in contact therewith to detect a touch position and outputs data representing the detected touch position to the processing device 12.

The imaging device 18 is, for example, a camera including the imaging lens 180, which collects light, and the imaging device 181, which converts collected light into an electric signal. The optical axes L11 and L12 are each the optical axis of the imaging lens 180. The imaging device 181 is, for example, an image sensor, such as a CCD or a CMOS device. CCD is an abbreviation for a charge coupled device, and CMOS is an abbreviation for complementary metal oxide semiconductor. The imaging device 18 acquires a captured image under the control of the imaging controller 121. The imaging device 18 outputs information representing the acquired captured image to the processing device 12. For example, the imaging device 18 acquires the captured image GC1 and the monitor image GC2. The imaging device 18 further outputs the imaging information 105 representing the captured image GC1 and the monitor information 106 representing the monitored image GC2 to the processing device 12.

1.4. Action of Smartphone

Figure 12:
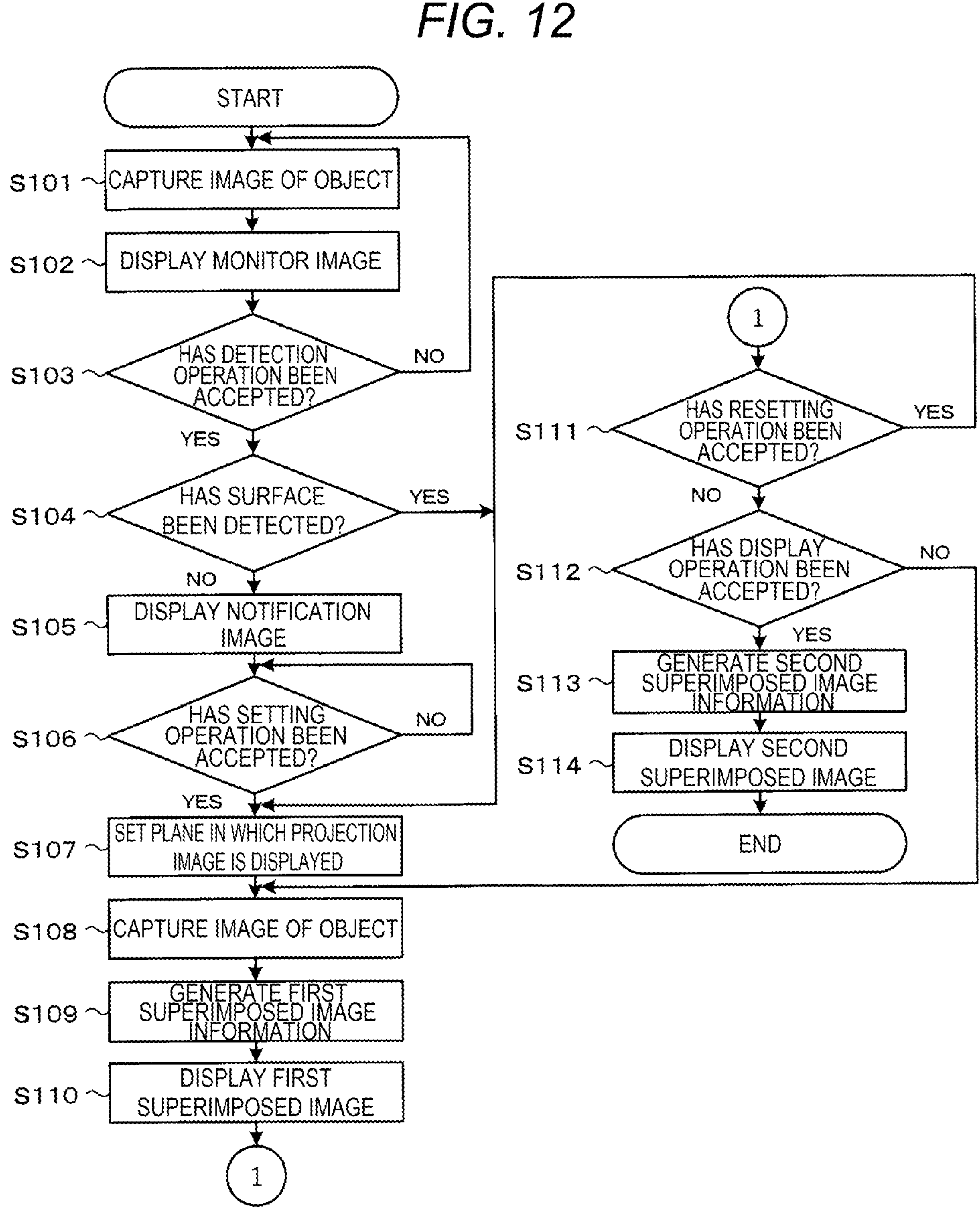
FIG. 12 is a flowchart for describing the action of the smartphone according to the embodiment.

FIG. 12 is a flowchart for describing the action of the smartphone 1 according to the embodiment. The series of actions shown in the flowchart is initiated, for example, when the smartphone 1 is powered on and the touch panel 16 accepts operation inputted from the user U and relating to the start of the action.

In step S101, the imaging controller 121 controls the imaging device 18 to capture an image of the object Ob1. The imaging controller 121 then acquires the monitor information 106 representing the result of the capturing an image of the object Ob1 from the imaging device 18. The imaging controller 121 causes the storage device 10 to store the acquired monitor information 106.

In step S102, the display controller 120 controls the display section 160 provided in the touch panel 16 to display the monitor image GC2 indicated by the monitor information 106.

In step S103, the input manager 122 determines whether the input section 161 has accepted the detection operation from the user U. When the input section 161 has accepted the detection operation from the user U, that is, when the result of the determination in step S103 is YES, the input manager 122 advances the process to the process in step S104. When the input section 161 has not accepted the detection operation from the user U, that is, when the result of the determination in step S103 is NO, the input manager 122 advances the process to the process in step S101.

When the input section 161 has not accepted the detection operation from the user U, the smartphone 1 causes the imaging device 18 to keep capturing images of the object Ob1 until the input section 161 accepts the detection operation from the user U. The smartphone 1 then keeps updating the monitor image displayed on the touch panel 16. It is assumed in the present embodiment that the user U performs the detection operation at the point of time when the monitor image GC2 is displayed on the touch panel 16.

In step S104, the detector 124 determines whether the monitor image GC2 contains an image showing the surface W3 of the object Ob1. When the detector 124 determines that the monitor image GC2 contains an image showing the surface W3 of the object Ob1, that is, when the result of the determination in step S104 is YES, the detector 124 advances the process to the process in step S107. When the detector 124 determines that the monitor image GC2 contains no image showing the surface W3 of the object Ob1, that is, when the result of the determination in step S104 is NO, the detector 124 advances the process to the process in step S105.

The determination in step S104 is performed after the detector 124 extracts a plurality of characteristic points from the monitor image and based on the number, positions, and other factors of the extracted plurality of characteristic points. Therefore, when characteristic points cannot be correctly extracted from the monitor image, and even when the monitor image contains an image showing a flat surface, the detector 124 may determine that the monitor image contains no image showing a flat surface.

In step S105, the display controller 120 controls the display section 160 provided in the touch panel 16 to display the notification image GN1 indicated by the notification information 108.

In step S106, the input manager 122 determines whether the input section 161 has accepted the setting operation from the user U. When the input section 161 has accepted the setting operation from the user U, that is, when the result of the determination in step S106 is YES, the input manager 122 advances the process to the process in step S107. When the input section 161 has not accepted the setting operation from the user U, that is, when the result of the determination in step S106 is NO, the input manager 122 carries out the process in step S106 again.

When the input section 161 has not accepted the setting operation from the user U, the input manager 122 repeats the determination in step S106 until the input section 161 accepts the setting operation from the user U. The touch panel 16 preferably keeps displaying the notification image GN1 until the input section 161 accepts the setting operation from the user U. The user U can thus grasp the action to be taken by the user U by checking the message contained in the notification image GN1.

In step S107, by updating the space information 101, the space manager 125 sets the surface W3 as the plane in which the projection image GP1 is virtually displayed.

In step S108, the imaging controller 121 controls the imaging device 18 to capture an image of the object Ob1. The imaging controller 121 then acquires the imaging information 105 representing the result of the capturing an image of the object Ob1 from the imaging device 18. The imaging controller 121 causes the storage device 10 to store the acquired imaging information 105.

In step S109, the image generator 123 generates the setting image information 107 representing the setting image GV1 based on the space information 101, the position information 102, and the posture information 103. The image generator 123 further generates the first superimposed image information 111 representing the first superimposed image GM11 based on the setting image information 107 and the imaging information 105.

In step S110, the display controller 120 controls the display section 160 provided in the touch panel 16 to display the first superimposed image GM11 indicated by the first superimposed image information 111.

In step S111, the input manager 122 determines whether the input section 161 has accepted the resetting operation from the user U. When the input section 161 has accepted the resetting operation from the user U, that is, when the result of the determination in step S111 is YES, the input manager 122 advances the process to the process in step S107. When the input section 161 has not accepted the resetting operation from the user U, that is, when the result of the determination in step S111 is NO, the input manager 122 advances the process to the process in step S112.

If the smartphone 1 is separate from the surface W3 of the object Ob1 in the setting operation in step S106, the processes up to step S110 are carried out so that the first superimposed image GM12 is displayed. When the image displayed in step S110 is the first superimposed image GM12, the user U can grasp that the plane set as the plane in which the projection image GP1 is virtually displayed is not the surface W3. In this case, the user U can perform the resetting operation with the smartphone 1 being in contact with the surface W3 of the object Ob1 to set the surface W3 as the plane in which the projection image GP1 is virtually displayed.

In step S112, the input manager 122 determines whether the input section 161 has accepted the display operation from the user U. When the input section 161 has accepted the display operation from the user U, that is, when the result of the determination in step S112 is YES, the input manager 122 advances the process to the process in step S113. When the input section 161 has not accepted the display operation from the user U, that is, when the result of the determination in step S112 is NO, the input manager 122 advances the process to the process in step S108.

When the input section 161 has not accepted the display operation from the user U, the smartphone 1 causes the imaging device 18 to keep capturing images of the object Ob1 until the input section 161 accepts the display operation from the user U. The smartphone 1 then keeps updating the image displayed on the touch panel 16. It is assumed in the present embodiment that the user U performs the display operation at the point of time when the first superimposed image GM11 is displayed on the touch panel 16.

In step S113, the image generator 123 generates the second superimposed image information 112 representing the second superimposed image GM21 based on the projection image information 104 and the imaging information 105.

In step S114, the display controller 120 controls the display section 160 provided in the touch panel 16 to display the second superimposed image GM21 indicated by the second superimposed image information 112.

When the user U performs the setting operation in step S107, the projection image GP1 is displayed with respect, for example, to the position of the image GW3 corresponding to the location where the imaging device 18 is located on the surface W3 at the point of time when the smartphone 1 accepts the setting operation. When the detector 124 detects the surface W3 in step S104, the smartphone 1, for example, sets the projection image GP1 to be virtually displayed on a portion of the surface W3 or the entire surface W3 based on the position and shape of the detected surface W3.

After the process in step S114 is carried out, the processing device 12 terminates the series of actions shown in the flowchart of FIG. 12.

As described above, according to the embodiment, the smartphone 1 can set the surface W3 as the plane in which the projection image GP1 is virtually displayed by accepting the setting operation from the user U with the smartphone 1 located at the surface W3 of the object Ob1. That is, the smartphone 1 can display the projection image GP1 superimposed on the image GW3 showing the surface W3 even when the surface W3 cannot be detected.

According to the embodiment, the smartphone 1 can indicate the position of the plane in which the projection image GP1 is virtually displayed by displaying the first superimposed image GM11 containing the setting image GV1. That is, the user U can check whether the setting operation has been performed with the imaging device 18 located at the surface W3.

As described above, the image displaying method according to the embodiment includes accepting from the user U the setting operation of setting the surface W3 of the object Ob1 located in the real space as the plane in which the projection image GP1 is virtually displayed, and displaying the first superimposed image GM11, in which the setting image GV1 showing the plane H1 containing the surface W3 is superimposed on the captured image GC1 generated by capturing an image of the object Ob1.

The smartphone 1 according to the embodiment includes the processing device 12, and the processing device 12 accepts from the user U the setting operation of setting the surface W3 of the object Ob1 located in the real space as the plane in which the projection image GP1 is virtually displayed, and outputs to the touch panel 16 the first superimposed image GM11, in which the setting image GV1 showing the plane H1 containing the surface W3 is superimposed on the captured image GC1 generated by capturing an image of the object Ob1.

The program 100 according to the embodiment causes the processing device 12 to accept from the user U the setting operation of setting the surface W3 of the object Ob1 located in the real space as the plane in which the projection image GP1 is virtually displayed, and output to the touch panel 16 the first superimposed image GM11, in which the setting image GV1 showing the plane H1 containing the surface W3 is superimposed on the captured image GC1 generated by capturing an image of the object Ob1.

That is, the image displaying method, the smartphone 1, and the program 100 according to the present embodiment can set the plane in which the projection image GP1 is virtually displayed, in other words, the position on the captured image GC1 on which the projection image GP1 is superimposed, based on the user U's operation. The smartphone 1 can therefore display the projection image GP1 at a position specified by the user U without using characteristic data representing the characteristics of the appearance of the object Ob1, which is the subject, so that the projection image GP1 can be displayed at an appropriate position.

Furthermore, the smartphone 1 according to the present embodiment can indicate the position of the plane in which the projection image GP1 is virtually displayed by displaying the first superimposed image GM11 containing the setting image GV1. The user U can thus check whether the setting operation has been performed as intended by the user U before the projection image GP1 is displayed.

In the present embodiment, the smartphone 1 is an example of the "information processing apparatus", the program 100 is an example of the "program", the object Ob1 is an example of the "object", the surface W3 is an example of the "first surface", the projection image GP1 is an example of the "projection image", the user U is an example of the "user", the captured image GC1 is an example of the "captured image", the plane H1 is an example of the "plane containing the first surface", the setting image GV1 is an example of the "setting image", the first superimposed image GM11 is an example of the "first superimposed image", the processing device 12 is an example of the "processing device", and the touch panel 16 is an example of the "display device".

In the image displaying method according to the embodiment, the captured image GC1 is acquired by the imaging device 18, the setting operation is performed with the imaging device 18 located at the surface W3 of the object Ob1, the method further includes acquiring the position information 102 representing the displacement DP1 of the imaging device 18 at the second point of time when the imaging device 18 acquires the captured image GC1 with respect to the position of the imaging device 18 at the first point of time when the setting operation is accepted, and the posture information 103 representing the change in the posture of the imaging device 18 at the second point of time with respect to the posture of the imaging device 18 at the first point of time, and the setting image GV1 is generated based on the position information 102 and the posture information 103.

That is, the smartphone 1 accepts the setting operation from the user U with the imaging device 18 located at the surface W3 of the object Ob1. The user U can thus accurately set the plane in which the projection image GP1 is virtually displayed through simple operation.

The first superimposed image GM11 is generated by superimposing the setting image GV1, which is generated based on the position information 102 and the posture information 103, on the captured image GC1. That is, for example, even when a plane that makes it difficult to extract characteristic points through image processing is set as the plane in which the projection image GP1 is virtually displayed, the smartphone 1 can identify the position of the plane. The smartphone 1 can thus properly superimpose the setting image GV1 at a predetermined position.

In the present embodiment, the imaging device 18 is an example of the "imaging device", the position information 102 is an example of the "position information," the posture information 103 is an example of the "posture information," and the displacement DP1 is an example of the "displacement".

The image displaying method according to the embodiment further includes accepting the detection operation of instructing detection of the surface W3 from the user U, and outputting, when the detection operation is accepted but the surface W3 is not detected, notification regarding the setting operation.

That is, the user U can use a plurality of methods to set the plane in which the projection image GP1 is virtually displayed. Usability at the setting of the plane in which the projection image GP1 is virtually displayed is thus improved.

In the present embodiment, "outputting notification regarding the setting operation" is, for example, displaying the notification image GN1 on the touch panel 16.

The image displaying method according to the embodiment further includes determining, when the detection operation is accepted, whether the monitor image GC2 generated by capturing an image of the object Ob1 contains an image showing the surface W3, and outputting the notification includes outputting the notification when the result of the determination shows that the monitor image GC2 contains no image showing the surface W3.

The user U can thus perform the detection operation while checking via the monitor image a plane that the user U desires to set as the plane in which the projection image GP1 is virtually displayed.

In the present embodiment, the monitor image GC2 is an example of the "monitor image". An "image showing the first surface" is an example of the images GW3 and GW3*a*.

The image displaying method according to the embodiment further includes accepting the display operation of displaying the projection image GP1 from the user U, and displaying, when the display operation is accepted, the second superimposed image GM21, in which the projection image GP1 is superimposed on a portion or the entirety of the region of the image GW3 contained in the captured image GC1.

When the display operation is accepted from the user U, the smartphone 1 superimposes the projection image GP1 on the captured image GC1. The user U can thus check through the second superimposed image GM21 how the projection image GP1 looks when projected in the real space.

In the present embodiment, the second superimposed image GM21 is an example of the "second superimposed image".

2. Variations

The embodiment described above can be changed in a variety of manners. Specific aspects of the changes will be presented below by way of example. Two or more aspects arbitrarily selected from those presented below by way of example may be combined with each other as appropriate to the extent that the selected aspects do not contradict each other. In the variations presented below by way of example, an element providing the same effect and having the same function as the element in the embodiment described above has the same reference character used in the above description, and no detailed description of the same element will be made as appropriate.

2.1. Variation 1

The aforementioned embodiment has been described with reference to the case where a projection image is virtually displayed on a surface of an object, and a virtual projector that projects a projection image may be displayed along with the projection image.

Figure 13:
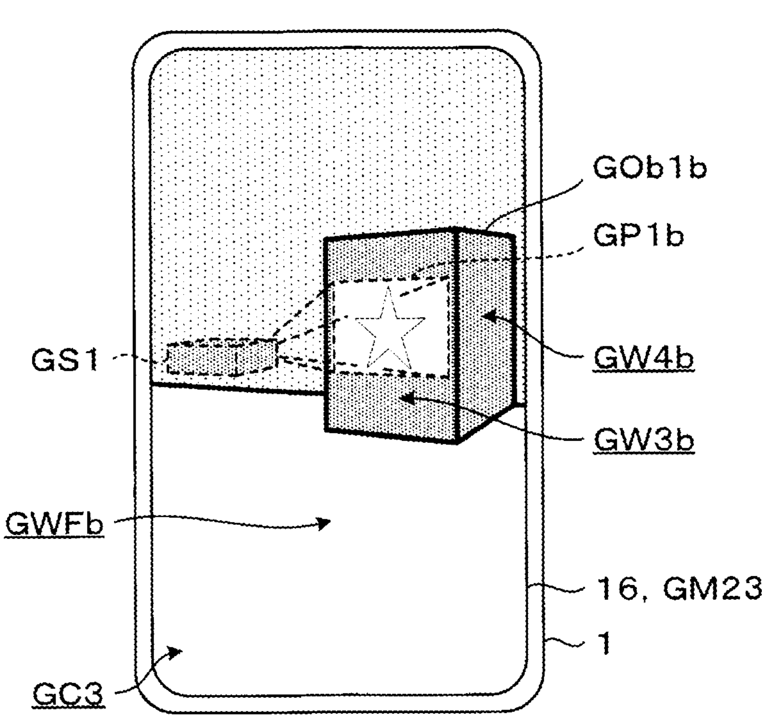
FIG. 13 is a diagrammatic view for describing another second superimposed image.

FIG. 13 is a diagrammatic view for describing a second superimposed image GM23. The second superimposed image GM23 is displayed on the touch panel 16 of the smartphone 1. The second superimposed image GM23 is an image in which a projection image GP1*b* and a projection apparatus image GS1 are superimposed on a captured image GC3 generated by the imaging device 18 through capturing an image of the object Ob1. The captured image GC3 contains an image GOb1*b* and an image GWFb. The image GOb1*b* contains images GW3*b* and GW4*b*. The image GW3*b* is an image showing the surface W3. The image GW4*b* is an image showing the surface W4. The image GWFb is an image showing the floor surface WF. The projection apparatus image GS1 is an image showing a virtual projector virtually disposed in the real space. The projection image GP1*b* is an image virtually projected onto the surface W3 from the virtual projector shown by the projection apparatus image GS1. That is, the projection image GP1*b* is superimposed on the image GW3*b* showing the surface W3. The configuration described above allows, for example, a simulation of how a projection image is displayed when a projector is disposed in the real space.

As described above, in the image displaying method according to Variation 1, the projection image GP1*b* is an image virtually projected from the virtual projector virtually disposed in the real space.

That is, the smartphone 1 can display the projection image GP1*b*, which is virtually displayed on a surface of the object Ob1 disposed in the real space, and the virtual projector, which virtually projects the projection image GP1*b*. The user U of the smartphone 1 can perform, for example, a simulation on how a projection image is displayed when a projector is disposed in the real space.

In Variation 1, the projection image GP1*b* is an example of the "projection image".

2.2. Variation 2

The aforementioned embodiment and variation have been described with reference to the case where a projection image is superimposed on an image showing the surface W3, in other words, the projection image is virtually displayed on the surface W3. However, the plane in which the projection image is virtually displayed may be a plane different from the surface W3. That is, the smartphone 1 may accept the setting operation from the user U with the imaging device 18 located at a surface different from the surface W3. For example, the smartphone 1 may accept the setting operation from the user U with the imaging device 18 located at the surface W2 of the object Ob1.

Figure 14:
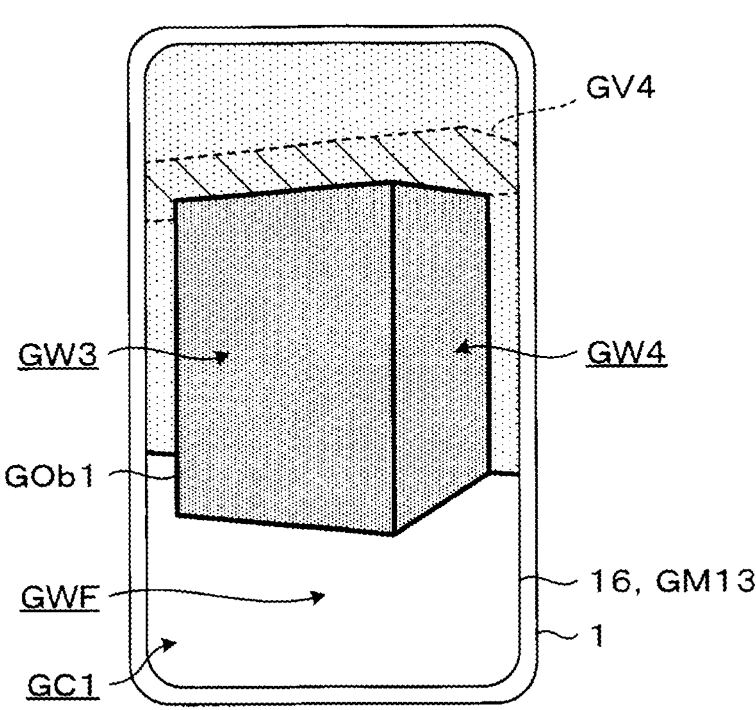
FIG. 14 is a diagrammatic view for describing a still another first superimposed image.

FIG. 14 is a diagrammatic view for describing a first superimposed image GM13. The first superimposed image GM13 is an image displayed on the touch panel 16 when the smartphone 1 accepts the setting operation from the user U with the smartphone 1 located at the surface W2 of the object Ob1. The first superimposed image GM13 is an image in which a setting image GV4 is superimposed on the captured image GC1. The setting image GV4 is an image showing a plane containing the surface W2. The setting image GV4 is an image showing the position of the plane in which the projection image is virtually displayed, as the setting image GV1 is. The user U can see that the plane in which the projection image is virtually displayed is the surface W2 by checking the setting image GV4. Since the captured image GC1 contains no image showing the surface W2, the user U preferably cause the smartphone 1 to acquire a captured image containing an image showing the surface W2 before performing the display operation. The object having a plane in which the projection image is virtually displayed may, for example, be the wall surface W1 itself. In this case, the smartphone 1 accepts the setting operation from the user U with the imaging device 18 located at the wall surface W1.

2.3. Variation 3

The aforementioned embodiment and variations have been described with reference to the case where the smartphone 1 is presented by way of example as the information processing apparatus according to the present disclosure, and the smartphone 1 may instead be a tablet terminal, a laptop computer, or any other apparatus having the same functions as those of the smartphone 1.

2.4. Variation 4

The aforementioned embodiment and variations have been described with reference to the case where the notification image GN1 containing a message that prompts the user U to perform the setting operation when the surface W3 is not detected, but the present disclosure is not limited to the aspect described above. For example, instead of displaying a message, the user U may be prompted by voice to perform the setting operation. That is, voice may be used to output notification about the setting operation.

What is claimed is:

1. An image displaying method comprising:

accepting from a user a setting operation of setting a first surface of an object located in a real space as a plane onto which a projection image is virtually displayed, the setting operation being performed with an imaging device located at the first surface of the object; and displaying a first superimposed image in which a setting image showing a plane containing the first surface is superimposed on a captured image generated by capturing an image of the object;

wherein the captured image is acquired by the imaging device, the setting operation is accepted at a first point of time, the imaging device acquires the captured image at a second point of time, the method further comprising acquiring position information representing displacement of the imaging device at the second point of time with respect to a position of the imaging device at the first point of time, and posture information representing a change in a posture of the imaging device at the second point of time with respect to the posture of the imaging device at the first point of time, and the setting image is generated based on the position information and the posture information.

2. The image displaying method according to claim 1, further comprising:

accepting a detection operation of instructing detection of the first surface from the user; and outputting, when the detection operation is accepted but the first surface is not detected, a notification regarding the setting operation.

3. The image displaying method according to claim 2, further comprising:

determining, when the detection operation is accepted, whether a monitor image generated by capturing an image of the object contains an image showing the first surface, wherein outputting the notification includes outputting the notification when a result of the determining shows that the monitor image does not contain the image showing the first surface.

4. The image displaying method according to claim 1, further comprising:

accepting a display operation of displaying the projection image from the user; and displaying, when the display operation is accepted, a second superimposed image in which the projection image is superimposed on a portion or entirety of a region of an image showing the first surface and contained in the captured image.

5. The image displaying method according to claim 4, wherein the projection image is an image virtually projected from a virtual projector virtually disposed in the real space.

6. An information processing apparatus comprising:

a processing device programmed to:

accept from a user a setting operation of setting a first surface of an object located in a real space as a plane onto which a projection image is virtually displayed, the setting operation being performed with an imaging device located at the first surface of the object, and output to a display device a first superimposed image in which a setting image showing a plane containing the first surface is superimposed on a captured image generated by capturing an image of the object;

wherein the captured image is acquired by the imaging device, the setting operation is accepted at a first point of time, the imaging device acquires the captured image at a second point of time, the processing device further programmed to acquire position information representing displacement of the imaging device at the second point of time with respect to a position of the imaging device at the first point of time, and posture information representing a change in a posture of the imaging device at the second point of time with respect to the posture of the imaging device at the first point of time, and the setting image is generated based on the position information and the posture information.

7. The information processing apparatus of claim 6, wherein the processing device is further programmed to:

accept detection operation of instructing detection of the first surface from the user; and output, when the detection operation is accepted but the first surface is not detected, a notification regarding the setting operation.

8. The information processing apparatus of claim 7, wherein the processing device is further programmed to:

determine, when the detection operation is accepted, whether a monitor image generated by capturing an image of the object contains an image showing the first surface, wherein the output of the notification includes outputting the notification when a result of the determining shows that the monitor image does not contain the image showing the first surface.

9. The information processing apparatus of claim 6, wherein the processing device is further programmed to:

accept display operation of displaying the projection image from the user; and display, when the display operation is accepted, a second superimposed image in which the projection image is superimposed on a portion or entirety of a region of an image showing the first surface and contained in the captured image.

10. The information processing apparatus of claim 9, wherein the projection image is an image virtually projected from a virtual projector virtually disposed in the real space.

11. A non-transitory computer readable storage medium storing program that causes a processing device to:

accept from a user a setting operation of setting a first surface of an object located in a real space as a plane onto which a projection image is virtually displayed, the setting operation being performed with an imaging device located at the first surface of the object, and output to a display device a first superimposed image in which a setting image showing a plane containing the first surface is superimposed on a captured image generated by capturing an image of the object;

wherein the captured image is acquired by the imaging device, the setting operation is accepted at a first point of time, the imaging device acquires the captured image at a second point of time, the processing device further programmed to acquire position information representing displacement of the imaging device at the second point of time with respect to a position of the imaging device at the first point of time, and posture information representing a change in a posture of the imaging device at the second point of time with respect to the posture of the imaging device at the first point of time, and the setting image is generated based on the position information and the posture information.

12. The non-transitory computer readable storage medium storing program of claim 11, that further that causes a processing device to:

accept a detection operation of instructing detection of the first surface from the user; and output, when the detection operation is accepted but the first surface is not detected, a notification regarding the setting operation.

13. The non-transitory computer readable storage medium storing program of claim 12, that further that causes a processing device to:

determine, when the detection operation is accepted, whether a monitor image generated by capturing an image of the object contains an image showing the first surface, wherein the output of the notification includes outputting the notification when a result of the determining shows that the monitor image does not contain the image showing the first surface.

14. The non-transitory computer readable storage medium storing program of claim 11, that further that causes a processing device to:

accept display operation of displaying the projection image from the user; and display, when the display operation is accepted, a second superimposed image in which the projection image is superimposed on a portion or entirety of a region of an image showing the first surface and contained in the captured image.

15. The non-transitory computer readable storage medium storing program of claim 14, wherein the projection image is an image virtually projected from a virtual projector virtually disposed in the real space.

* * * * *